United States Patent
Fischer et al.

(10) Patent No.: US 12,296,780 B2
(45) Date of Patent: May 13, 2025

(54) FRONT AIRBAG FOR A VEHICLE OCCUPANT, VEHICLE OCCUPANT PROTECTION SYSTEM, AND METHOD FOR OPERATING A VEHICLE OCCUPANT PROTECTION SYSTEM

(71) Applicant: ZF AUTOMOTIVE GERMANY GMBH, Alfdorf (DE)

(72) Inventors: Christian Fischer, Plüderhausen (DE); Alexander Vogel, Aalen (DE)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 0 days.

(21) Appl. No.: 18/555,557

(22) PCT Filed: Apr. 14, 2022

(86) PCT No.: PCT/EP2022/060034
§ 371 (c)(1),
(2) Date: Oct. 16, 2023

(87) PCT Pub. No.: WO2022/223432
PCT Pub. Date: Oct. 27, 2022

(65) Prior Publication Data
US 2024/0208452 A1    Jun. 27, 2024

(30) Foreign Application Priority Data
Apr. 20, 2021    (DE) ............ 10 2021 109 955.2

(51) Int. Cl.
 *B60R 21/2338*    (2011.01)
 *B60R 21/01*    (2006.01)
 *B60R 21/00*    (2006.01)

(52) U.S. Cl.
CPC .......... *B60R 21/2338* (2013.01); *B60R 21/01* (2013.01); *B60R 2021/0009* (2013.01);
(Continued)

(58) Field of Classification Search
CPC ............... B60R 21/2334; B60R 2021/23388
See application file for complete search history.

(56) References Cited

U.S. PATENT DOCUMENTS

| | | |
|---|---|---|
| 6,308,983 B1 | 10/2001 | Sinnhuber |
| 2004/0021305 A1 | 2/2004 | Takagi et al. |

(Continued)

FOREIGN PATENT DOCUMENTS

| | | | |
|---|---|---|---|
| DE | 102010001502 A1 | 8/2011 | |
| DE | 102014204436 A1 * | 9/2015 | ........... B60R 21/239 |

(Continued)

OTHER PUBLICATIONS

PCT International Search Report for corresponding International Application Serial No. PCT/EP2022/060034, mailed Jul. 12, 2022, pp. 1-6.

*Primary Examiner* — Nicole T Verley
(74) *Attorney, Agent, or Firm* — Tarolli, Sundheim, Covell & Tummino LLP

(57) ABSTRACT

A front airbag (10) for the protection of a vehicle occupant (12) in a vehicle which is specifically a passenger airbag for the protection of a passenger, in the installed and inflated state includes a contact wall (20) facing the vehicle occupant (12) and an opposite rear wall (22) as well as a first sidewall (24) facing the vehicle center as seen by the vehicle occupant (12) and an opposite second sidewall (26). The airbag (10) further includes a limiting device which, in the inflated state of the airbag (10), prevents the first sidewall (24) from further deploying so that the airbag (10) takes a first volume. The limiting device can be influenced when the head (14) of the vehicle occupant (12) contacts the airbag (10) such that it allows the first sidewall (24) to further deploy so that the airbag (10) takes a second volume larger as compared to the first volume. Accordingly, at least a major part of the volume (Continued)

of the airbag (10) increases in the direction of the vehicle center as seen by the vehicle occupant (12).

12 Claims, 2 Drawing Sheets

(52) U.S. Cl.
CPC ............... *B60R 2021/0048* (2013.01); *B60R 2021/01225* (2013.01); *B60R 2021/01286* (2013.01)

(56) References Cited

U.S. PATENT DOCUMENTS

| | | | | |
|---|---|---|---|---|
| 2013/0147169 A1* | 6/2013 | Boyle, III | ............ | B60R 21/239 280/739 |
| 2016/0001733 A1* | 1/2016 | Kim | ............ | B60R 21/239 280/729 |
| 2017/0158154 A1 | 6/2017 | Kobayashi et al. | | |
| 2017/0217399 A1* | 8/2017 | Patel | ............ | B60R 21/2334 |
| 2020/0353886 A1 | 11/2020 | Robertson et al. | | |
| 2021/0170970 A1* | 6/2021 | Peremarty | ............ | B60R 21/16 |
| 2021/0213903 A1* | 7/2021 | Deng | ............ | B60R 21/207 |

FOREIGN PATENT DOCUMENTS

| | | | | |
|---|---|---|---|---|
| DE | 1020105104092 A1 | 10/2015 | | |
| DE | 102015004956 A1 | 10/2016 | | |
| EP | 3300957 A1 * | 4/2018 | ........... | B60R 21/205 |
| EP | 3530526 A1 * | 8/2019 | ........... | B60R 21/205 |
| FR | 3014387 A1 * | 6/2015 | ......... | B60R 21/2338 |
| JP | 2009206159 A | 9/2009 | | |
| WO | WO-2017032522 A1 * | 3/2017 | | |

* cited by examiner

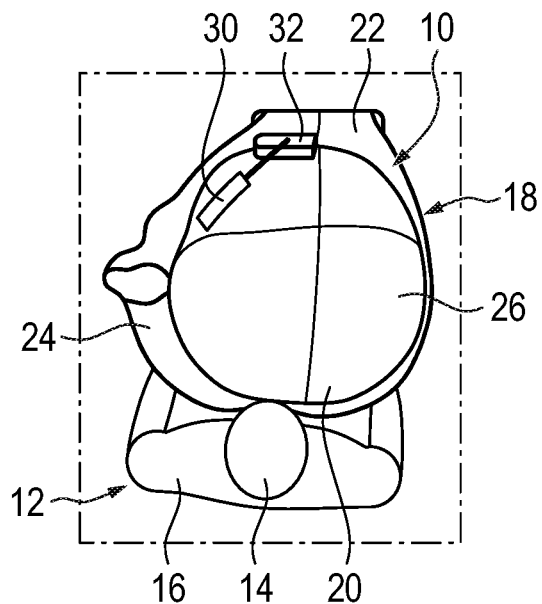
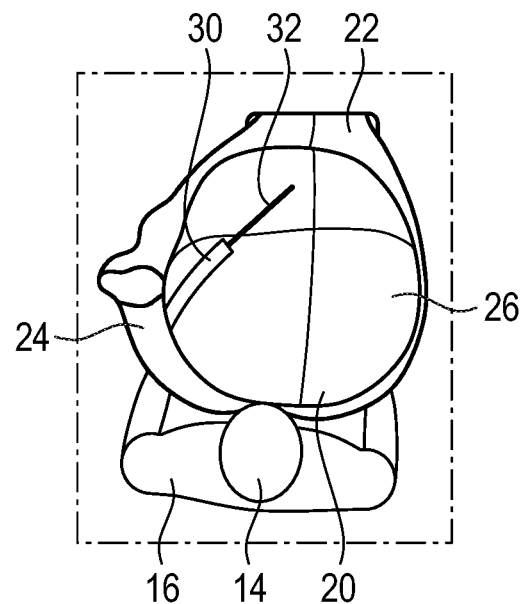
Fig. 2a  Fig. 2b
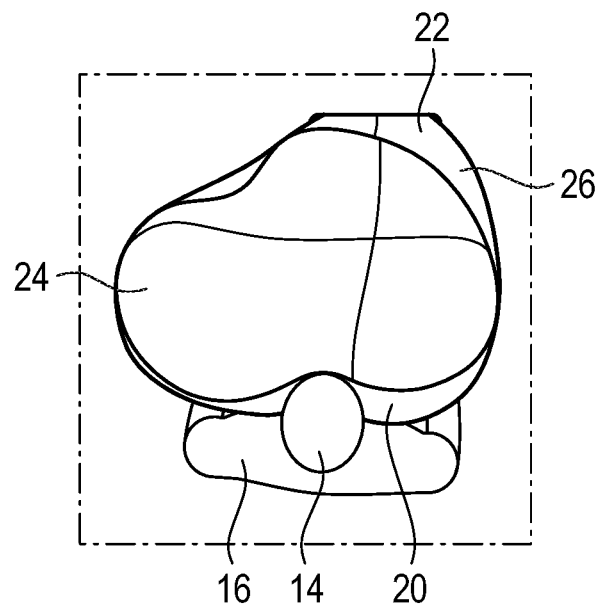
Fig. 2c

FRONT AIRBAG FOR A VEHICLE OCCUPANT, VEHICLE OCCUPANT PROTECTION SYSTEM, AND METHOD FOR OPERATING A VEHICLE OCCUPANT PROTECTION SYSTEM

RELATED APPLICATIONS

This application is a U.S. National Stage Application filed under 35 USC 371, claiming priority to Serial No. PCT/EP2022/060034, filed on 14 Apr. 2022; which claims priority from German Patent Application DE 10 2021 109 955.2, filed 20 Apr. 2020, the entireties of which are hereby incorporated herein by reference.

TECHNICAL FIELD

The invention relates to a front airbag for the protection of a vehicle occupant in a vehicle, specifically to a passenger airbag for the protection of a passenger. Further, the invention relates to a vehicle occupant protection system, specifically for a passenger, comprising such airbag. In addition, the invention relates to a method of operating such vehicle occupant protection system.

BACKGROUND

A front airbag for a passenger is usually accommodated in the instrument panel of the vehicle and, in the case of restraint, exits the same to extend in the direction of the vehicle occupant. The part of the airbag wall facing the vehicle occupant in the inflated state and being contacted by the vehicle occupant is referred to as contact wall.

It is generally known to dispose tensile means, usually in the form of tethers, in airbags so as to impart a specific shape to the airbag, i.e., to prevent specific portions of the airbag wall from moving in a free and unhindered manner during deployment.

In the case of front airbags, it is moreover crucial to guarantee sufficient protection not only in the case of a frontal collision but also in the case of an oblique collision. In the common safety evaluation programs of new vehicles, also collision test evaluations of standardized oblique collisions on the basis, inter alia, of a criterion for evaluating brain lesions due to acceleration (BrlC) will probably be incorporated in the future.

From DE 10 2015 004 956 A1, a passenger airbag is known which counteracts lateral slipping of the head and a neck rotation, respectively, after the head of the vehicle occupant impacts on the contact wall of the airbag. For this purpose, inside the airbag plural tensile means are attached which partially restrain the contact wall in the inflated state of the airbag and form at least one lateral bead and plural central beads having a smaller cross-section than the lateral beads.

SUMMARY

It is the object of the present invention to design a front airbag for a vehicle occupant, specifically a passenger airbag, with simpler means so that it offers proper protection in the case of oblique collision, particularly in respect of a possible angular acceleration of the head of the vehicle occupant which may occur after the head has impacted on the airbag as a result of restraining the head on the contact wall of the airbag.

This object is achieved by a front airbag for a vehicle occupant comprising the features of claim 1. Advantageous and useful configurations of the front airbag according to the invention are described in the related subclaims.

The front airbag according to the invention for the protection of a vehicle occupant in a vehicle, which is specifically a passenger airbag for the protection of a passenger, in the installed and inflated state includes a contact wall facing the vehicle occupant and an opposite rear wall as well as a first sidewall facing the vehicle center as seen by the vehicle occupant and an opposite second sidewall. Furthermore, the airbag has a limiting device preventing the first sidewall, in the inflated state of the airbag, from further deploying so that the airbag takes a first volume. The limiting device can be influenced, when the head of the vehicle occupant contacts the airbag, such that it allows further deployment of the first sidewall so that the airbag takes a second volume larger compared to the first volume. Accordingly, at least a major part of the volume of the airbag is increased toward the vehicle center as seen by the vehicle occupant.

The invention is based on the finding that, in the case of oblique collision, a completely inflated airbag may result, due to its hardness and the shape of its contact wall, in the fact that such high angular acceleration is imparted to the head of the vehicle occupant that the risk of a brain lesion may be increased. Therefore, the invention provides as counter-measures, on the one hand, to suddenly increase the volume of the airbag when the head of the vehicle occupant impacts on the airbag so as to obtain an abrupt pressure drop in the airbag. This favors relatively unhindered penetration of the head so that a rotation of the head induced by the contact wall is largely suppressed. On the other hand, the invention provides that, when the head impacts on the airbag, the airbag expands particularly in the direction of the vehicle center (as viewed by the vehicle occupant). In this way, a torque is transmitted to the head of the vehicle occupant which is opposed to the angular acceleration caused by the oblique collision and, thus, also contributes to reducing the risk of brain lesion.

Concretely, the limiting device provided according to the invention prevents the airbag from completely deploying so that the airbag takes a first volume with a relatively high internal pressure which is provided in particular for the case of a frontal collision. If an oblique collision is detected, however, the limiting device can be manipulated in such a way, when the head impacts on the airbag, that the first sidewall of the airbag facing the vehicle center can completely deploy, causing an additional volume of the airbag to be released toward the vehicle center. On the whole, the airbag then takes a significantly larger second volume with a noticeably lower internal pressure.

The airbag according to the invention offers the further advantage that the selective pressure reduction can also be used in specific other detected load cases, as far as a softer airbag is desired in those cases.

It has turned out that, for the desired purpose of an improved oblique collision protection, an increase in volume of the airbag by 20% is optimal, that is, the second volume of the airbag should be approximately 1.2 times the first volume.

In further embodiments, the increase in volume ranges from 10% to 30%, preferably from 15% to 25%, that is, the second volume of the airbag should be approximately 1.1 times to 1.3 times, preferably 1.15 times to 1.25 times the first volume.

In a preferred first embodiment of the airbag according to the invention, the limiting device comprises a tether. Tethers are well-established auxiliaries used in many airbags; however, usually they serve for restraining particular portions of the airbag in such a way that a specific shape which cannot be easily reached only by the design of the airbag wall is imparted to the airbag in the inflated state. In the first embodiment of the invention, the tether serves for preventing the first sidewall of the airbag facing the vehicle center from deploying completely so that the airbag is sufficiently hard in particular for a frontal collision. However, this effect of the tether can be eliminated for a detected oblique collision to provide the additional volume of the airbag in this way.

It is useful for this purpose, on the one hand, to connect the tether to the first sidewall of the airbag and, on the other hand, to couple the tether to an activatable release unit which can cancel the restraining effect of the tether.

Where appropriate, the activatable release unit can be combined with a so-called active-bag-vent functionality (ABV). This known and proven technology is based on at least one discharge opening in the airbag which is closed at the beginning of the collision scenario so that the airbag can be filled rapidly. A time control ensures that the discharge opening is opened at a later point in time. Concretely, the discharge opening can initially be kept closed by means of a tether and can then be opened by specifically releasing the tether. For this purpose, the tether of the limiting device according to the invention or any other tether can be used which is coupled to the release unit.

In a second preferred embodiment of the airbag according to the invention, the limiting device includes a fold formed in the first sidewall which is temporarily secured, preferably by a tear seam or an adhesive. In this embodiment, the temporary securing prevents the fold in the first sidewall from unfolding when the airbag is filled. If necessary, said securing can be can be removed, however, to release the additional volume of the airbag toward the vehicle center and to lower the internal pressure.

In any case, the temporary securing of the fold should be designed in such a way that, in the inflated state of the airbag, it withstands the internal pressure. This ensures that the airbag can provide, in other load cases, in particular in the event of a head-on collision, a higher internal pressure as compared to an oblique collision.

For forming the fold, a textile cutting can be provided in addition to the first sidewall.

Preferably, the fold or the textile cutting, respectively, is coupled to an activatable release unit which can cause the fold of the first sidewall to unfold. The release unit may advantageously be designed such that, when releasing the fold, the respective portion of the first sidewall or the textile cutting is actively accelerated in the direction of the vehicle center to assist quick expansion of the airbag in said direction.

The invention also provides a vehicle occupant protection system, specifically for a passenger, comprising an airbag according to the invention, a detection device, a control unit coupled to the detection device, and a release unit coupled to the control unit. The detection device is arranged to detect, after an oblique collision, a contact of the head of the vehicle occupant with the airbag and to signal said contact to the control unit. The control unit is arranged to then activate the release unit. The release unit in turn is arranged to influence the limiting device so that the latter initiates further unfolding of the first sidewall.

For inflating the airbag, an inexpensive single-stage inflator can be provided. Since the airbag according to the invention can basically provide two differently large volumes, but the larger second volume is intended to have a lower internal pressure compared to the smaller first volume, a defined amount of gas of a single-stage inflator can basically meet both requirements, if it is appropriately dimensioned.

In addition, the invention provides a method of operating a vehicle occupant protection system according to the invention comprising the following steps of: detecting an oblique collision and a contact of the head of the vehicle occupant with the airbag caused by the oblique collision by means of the detection device; signaling the contact to the control unit; activating the release unit by the control unit; and influencing the limiting device of the airbag by the release unit in such a way that the first sidewall will further unfold.

BRIEF DESCRIPTION OF DRAWINGS

Further features and advantages of the invention will be evident from the following description and the attached drawings which are referred to, and wherein:

FIG. 2a shows a top view onto an inflated front airbag according to the invention as part of a vehicle occupant protection system according to the invention in the installed and inflated state as set forth in a second embodiment;

FIG. 2b shows the airbag of FIG. 2a just before the impact of the vehicle occupant; and FIG. 2c shows the airbag of FIG. 2a after the impact of the vehicle occupant.

DESCRIPTION

Figure 1A:
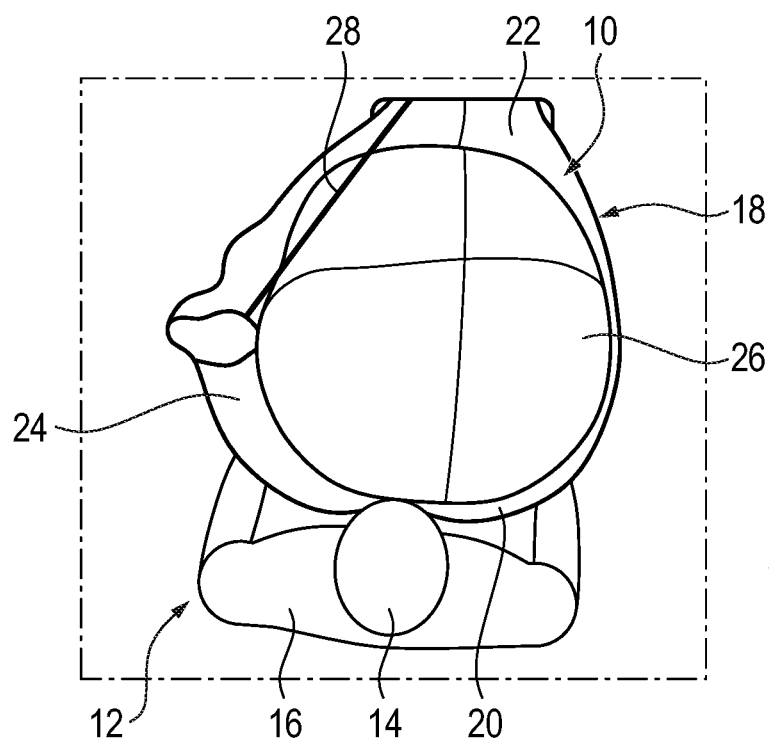
FIG. 1a shows a top view onto an inflated front airbag according to the invention as part of a vehicle occupant protection system according to the invention in the installed and inflated state as set forth in a first embodiment.

FIG. 1a illustrates a first embodiment of a front airbag 10, more precisely a front passenger airbag, in a vehicle in the installed and inflated state. The vehicle occupant 12 (passenger) to be protected by the airbag is shown with his/her head 14 and his/her torso 16.

The airbag 10 is part of an airbag module which in turn is part of a vehicle occupant protection system. The airbag module comprises a module case in which, apart from the airbag 10, an inflator is accommodated. The inflator is a single-stage or multi-stage inflator having one or more discharge openings. When the inflator fills the initially folded airbag 10 with gas, the airbag 10 deploys out of the module case toward the vehicle occupant 12. Alternatively, a filling by plural inflators is also possible.

The airbag 10 has an outer wall 18 which can be divided into plural portions. The area facing the vehicle occupant 12 in the inflated state is referred to as contact wall 20 and the area opposite to the contact wall 20 which is fastened on the module side is referred to as rear wall 22. The areas between the contact wall 20 and the rear wall 22 are referred to as sidewalls 24, 26.

Hereinafter, the longitudinal direction of the vehicle in the driving direction is referred to as x-direction, the transverse direction of the vehicle perpendicular thereto in the direction of the vehicle center as seen by the passenger is referred to as y-direction, and the vertical direction of the vehicle perpendicular to the x- and y-directions and facing upwards is referred to as z-direction.

In the situation illustrated in FIG. 1a just after an oblique collision, the airbag 10 is inflated, to be sure, but not completely deployed. A limiting device prevents the airbag 10, specifically the first sidewall 24 thereof which, as seen by the vehicle occupant 12, faces the vehicle center in the y-direction, from completely deploying.

Here, the limiting device comprises a (symbolized) tether 28 which may be arranged outside or inside of the airbag 10. A first end of the tether 28 is connected to the first sidewall 24, while the second end or a central portion of the tether 28 is coupled to an activatable release unit (tether activation unit, TAU). The release unit is connected to a control unit of the vehicle occupant protection system which is also connected to a detection device capable of detecting the contact of the head 14 of the vehicle occupant 12 with the airbag 10 as a result of an oblique collision.

Figure 1B:
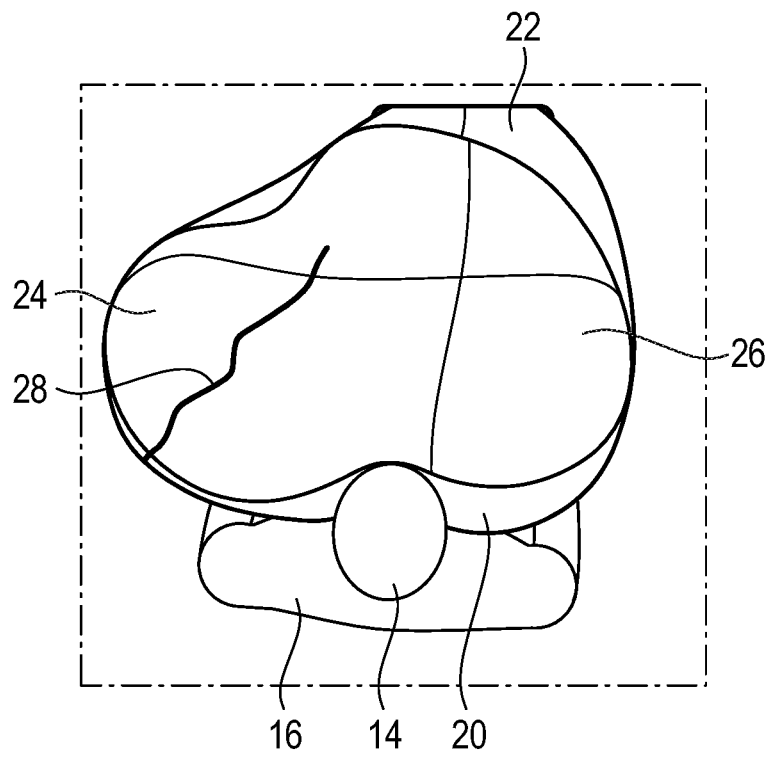
FIG. 1b shows the airbag of FIG. 1a after the impact of the vehicle occupant.

As soon as the detection device signals the control unit that the head 14 of the vehicle occupant 12 impacts on the contact wall 20 of the airbag 10, the tether 28 is released by the release unit so that the airbag 10 deploys completely, as illustrated in FIG. 1b. Accordingly, in particular the effective surface of the first sidewall 24 is increased.

The release of the tether 28 causes the volume of the airbag 10 to suddenly increase by about 20%. Accordingly, the pressure inside the airbag 10 is significantly reduced. The lower pressure of the airbag 10 allows, in contrast to a bulging airbag, the head 14 of the vehicle occupant 12 to penetrate the airbag 10 relatively unhindered particularly in the x-direction, without being allowed to rotate excessively about the z-axis, which would be basically possible in a bulging airbag due to the strong restraining effect on the contact wall 20. Therefore, despite the oblique collision, only a low angular acceleration is imparted to the head 14 so that the risk of brain lesion of the vehicle occupant 12 is relatively small.

In FIGS. 2a to 2c, a second embodiment of the airbag 10 is shown which offers a similar protective effect. In this embodiment, too, the deployment of the airbag 10 is initially restricted by a limiting device. As illustrated in FIG. 2a, a part of the first sidewall 24 which, as seen by the vehicle occupant 12, faces the vehicle center in the y-direction is not fully deployed before the impact of the vehicle occupant 12.

Here, the first sidewall 24 includes a (symbolized) fold 30 which is temporarily secured with the aid of a tear seam or an adhesive or the like and is retained in the initially inflated state of the airbag 10, i.e., before the impact of the vehicle occupant 12. The fold 30 may also formed by means of an additional (separate) textile cutting.

The fold 30 or the textile cutting, respectively, is coupled to a (symbolized) pyrotechnical release unit 32 which is adapted to cancel the temporary securing and to cause the fold 30 on the first sidewall 24 to unfold. As in the first embodiment, the release unit 32 is connected to a control unit of the vehicle occupant protection system. This is also applicable to a detection device.

The detection device signals the control unit that the head 14 of the vehicle occupant 12 has impacted on the airbag 10 (FIG. 2b), whereupon the control unit activates the release unit. FIG. 2c illustrates in which way the airbag deployment changes as soon as the fold 30 is released. The volume of the airbag 10 increases suddenly by about 20%, causing the pressure inside the airbag 10 to drop abruptly. Similar to FIG. 1b, also in this case it is clearly visible that after release of the fold 30 the airbag 10 expands particularly in the y-direction.

As in the first embodiment, the abrupt drop of pressure inside the airbag 10 results in the head 14 of the vehicle occupant 12 penetrating the airbag 10 relatively unhindered in the x-direction. In addition, the additional deployment of the airbag 10 in the y-direction which is adapted in time to the impact of the vehicle occupant 12 ensures that a torque counteracting the angular acceleration of the head 14 about the z-axis induced by the oblique collision is imparted to the head 14 of the occupant with respect to the z-direction. Thus, the risk of brain lesion of the vehicle occupant 12 is comparatively small.

LIST OF REFERENCE NUMERALS 10 airbag
12 vehicle occupant
14 head
16 torso
18 outer wall
20 contact wall
22 rear wall
24 sidewall
26 sidewall
28 tether
30 fold
32 release unit

The invention claimed is:

1. A front airbag for the protection of a vehicle occupant in a vehicle,
   wherein the airbag in the installed and inflated state includes a contact wall facing the vehicle occupant and an opposite rear wall as well as a first sidewall facing the vehicle center as seen by the vehicle occupant and an opposite second sidewall,
   wherein the airbag includes a limiting device which, in the inflated state of the airbag, prevents the first sidewall from further deploying so that the airbag takes a first volume,
   wherein the limiting device is configured to be influenced by the head of the vehicle occupant contacting the airbag such that the limiting device allows the first sidewall to further deploy so that the airbag takes a second volume larger as compared to the first volume, wherein at least a major part of the volume of the airbag increases in the direction of the vehicle center as seen by the vehicle occupant.

2. The front airbag according to claim 1, wherein the second volume is about 20% larger than the first volume.

3. The front airbag according to claim 1, wherein the limiting device comprises a tether.

4. The front airbag according to claim 1, wherein the tether is connected, on the one hand, to the first sidewall and is coupled, on the other hand, to an activatable release unit.

5. The front airbag according to claim 1, wherein the limiting device includes a fold formed in the first sidewall which is temporarily secured.

6. The front airbag according to claim 1, wherein the limiting device includes a fold formed in the first sidewall which is temporarily secured.

7. The front airbag according to claim 5, wherein the temporary securing of the fold is designed so that in the inflated state of the airbag it withstands the internal pressure.

8. The front airbag according to claim 5, wherein the fold is coupled to an activatable release unit which can release the fold from an inner face of the first sidewall.

9. The front airbag according to claim 8, wherein the release unit is configured to influence the limiting device in response to contact of the head of the vehicle occupant with the airbag such that the limiting device initiates the further deployment of the first sidewall.

10. The vehicle occupant protection system according to claim 1, wherein a single-stage inflator is provided to inflate the airbag.

11. A method of operating a vehicle occupant protection system according to claim 1, comprising the following steps of:
- detecting an oblique collision and a contact of the head of the vehicle occupant with the airbag caused by the oblique collision by way of the detection device;
- activating the release unit in response to detecting the oblique collision and contact of the head of the vehicle occupant with the airbag; and
- influencing the limiting device of the airbag by the release unit such that the first sidewall further deploys.

12. The vehicle occupant protection system according to claim 1, wherein the airbag is configured to be free from rearward expansion in response to the limiting device allowing the first sidewall to further deploy.

* * * * *